United States Patent
Chen

(10) Patent No.: US 8,195,861 B2
(45) Date of Patent: Jun. 5, 2012

(54) HUB APPARATUS WITH OTG FUNCTION

(75) Inventor: Johnny Chen, Santa Ana, CA (US)

(73) Assignee: I/O Interconnect, Ltd., Santa Ana, CA (US)

(*) Notice: Subject to any disclaimer, the term of this patent is extended or adjusted under 35 U.S.C. 154(b) by 0 days.

(21) Appl. No.: 13/160,805

(22) Filed: Jun. 15, 2011

(65) Prior Publication Data

US 2011/0314188 A1    Dec. 22, 2011

Related U.S. Application Data

(60) Provisional application No. 61/355,700, filed on Jun. 17, 2010.

(51) Int. Cl.
G06F 13/00 (2006.01)
G06F 3/00 (2006.01)

(52) U.S. Cl. .................. 710/300; 710/2; 710/5; 710/8; 710/15; 710/33

(58) Field of Classification Search .................. None
See application file for complete search history.

(56) References Cited

U.S. PATENT DOCUMENTS

| 2004/0019732 A1* | 1/2004 | Overtoom et al. ............. 710/313 |
| 2006/0065743 A1* | 3/2006 | Fruhauf ......................... 235/492 |
| 2008/0250462 A1* | 10/2008 | Crohas ............................. 725/74 |

* cited by examiner

Primary Examiner — Scott Sun

(57) ABSTRACT

A hub apparatus provided by the present invention comprises an OTG (on-the-go) control module and at least one USB port and a linking module. The OTG control module has a buffer and be coupled to the USB port and the linking module. When the host apparatus and the peripheral apparatus link with the hub apparatus, the OTG control module captures a data, which is asserted by a user through the host apparatus, from the peripheral apparatus via the USB port, and saves the captured data into the buffer, so as to move the data saved into the buffer to the host apparatus via a data transmission for responding a data capturing requirement from the host apparatus.

9 Claims, 5 Drawing Sheets

HUB APPARATUS WITH OTG FUNCTION

CROSS-REFERENCE TO RELATED APPLICATIONS

The application claims priority of U.S. provisional patent application Ser. No. 61/355,700 filed on Jun. 17, 2010, the contents of which are hereby incorporated by reference.

FIELD OF THE INVENTION

The present invention relates a data access technology, and in particularly relates a data access technology of a host apparatus and a peripheral apparatus.

BACKGROUND OF THE INVENTION

Since technology of mobile network is improve, more and more portable electric apparatuses are applied wildly. These portable electric apparatuses are like smart phone, e-book reader, tablet computer, etc. Through these portable electric apparatus, a user can link to internet everywhere.

In these portable electric apparatuses, at least one data exchange port is equipped thereon. Most of the portable electric apparatuses have usual data exchange ports, such like USB port, but a few of portable electric apparatuses have unique data exchange ports. If the portable electric apparatuses with an unique data exchange port requires to access data with another apparatus without the unique data exchange port such as the data from one of the said portable electric apparatuses being sent to another apparatus, in one of prior manners, a user would need to use a transforming line to link the said portable electric apparatus to a computer apparatus such like a desktop computer, and thereby operates the portable electric apparatus sending the data, which is ready to be sent to another apparatus, to the compute apparatus through the transforming line first. Meanwhile, the data which should be sent to another apparatus is now stored in the compute apparatus temporarily.

Then, the user needs to link another apparatus to the compute apparatus, and thereby controls the compute apparatus to send the data from the said portable electric apparatus to another apparatus. Obviously, this prior manner is very inconvenient.

SUMMARY OF THE INVENTION

Therefore, the present invention provides a hub apparatus and a method for helping a host apparatus to capture data with a peripheral apparatus directly.

A hub apparatus provided by the present invention comprises an OTG (on-the-go) control module and at least one USB port and a linking module. The OTG control module has a buffer and be coupled to the USB port and the linking module. When the host apparatus and the peripheral apparatus link with the hub apparatus, the OTG control module captures a data, which is asserted by a user through the host apparatus, from the peripheral apparatus via the USB port, and saves the captured data into the buffer, so as to move the data saved into the buffer to the host apparatus via a data transmission for responding a data capturing requirement from the host apparatus.

In one embodiment of the present invention, the OTG control module further has a first OTG controller, a second OTG controller, and a processor coupled to the first and the second OTG controllers. Wherein, the first OTG controller is configured as a host terminal and coupled to the USB port. In addition, the second OTG controller is coupled to the linking module and configured as a peripheral terminal. Therefore, the processor controls the first OTG controller to capture the data and save the captured data into the buffer. Then, the processor moves the data saved into the buffer to the second OTG controller, so as to control the second OTG controller send the data to the host apparatus via the data transmission interface.

From another viewpoint, a method provided by the present invention is suitable for the host apparatus without the OTG function and the peripheral apparatus. First, the method provides a hub with a OTG function. When the host apparatus and the peripheral apparatus link with the hub, the method sets the host apparatus as a host device and the peripheral apparatus as a storage device. When a data captured requirement is generated by the host device, the method sets the hub as a host device for capturing a data from the storage device. Then, the captured data is saved into a buffer configured in the hub. Next, the hub is set as the storage device, so as to use a data transmission interface to move the data saved into the buffer to the host device.

In one embodiment of the present invention, the step of using the data transmission interface comprises to use Bluetooth transmission interface, infrared transmission interface, WiFi transmission interface, 3G (third-generation) mobile transmission interface, or 4G (fourth generation) mobile transmission interface.

Since the present invention provides the hub apparatus with the OTG function, the hub can help the host apparatus obtain the data through the OTG function even the host apparatus without the OTG function.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
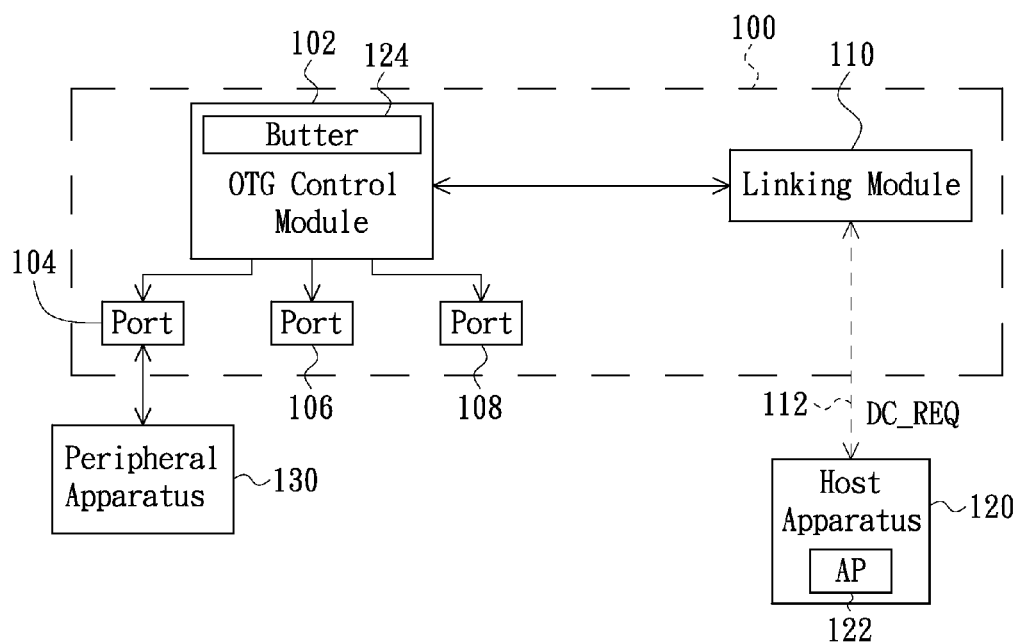
FIG. 1 is a block diagram of a hub apparatus according to a first embodiment of the present invention.

FIG. 1 is a system block diagram of a hub apparatus according to a first embodiment of the present invention. Referring FIG. 1, a hub apparatus 100 provided by the embodiment comprises an OTG control module 102, at least one USB port, and a linking module 110. In this embodiment, there are ports 104, 106 and 108 in the hub apparatus 100. In addition, the ports 104, 106 and 108 is coupled to the OTG control module 102. Furthermore, the OTG control module 102 has a buffer 124 and be coupled to the linking module 110.

Figure 2:
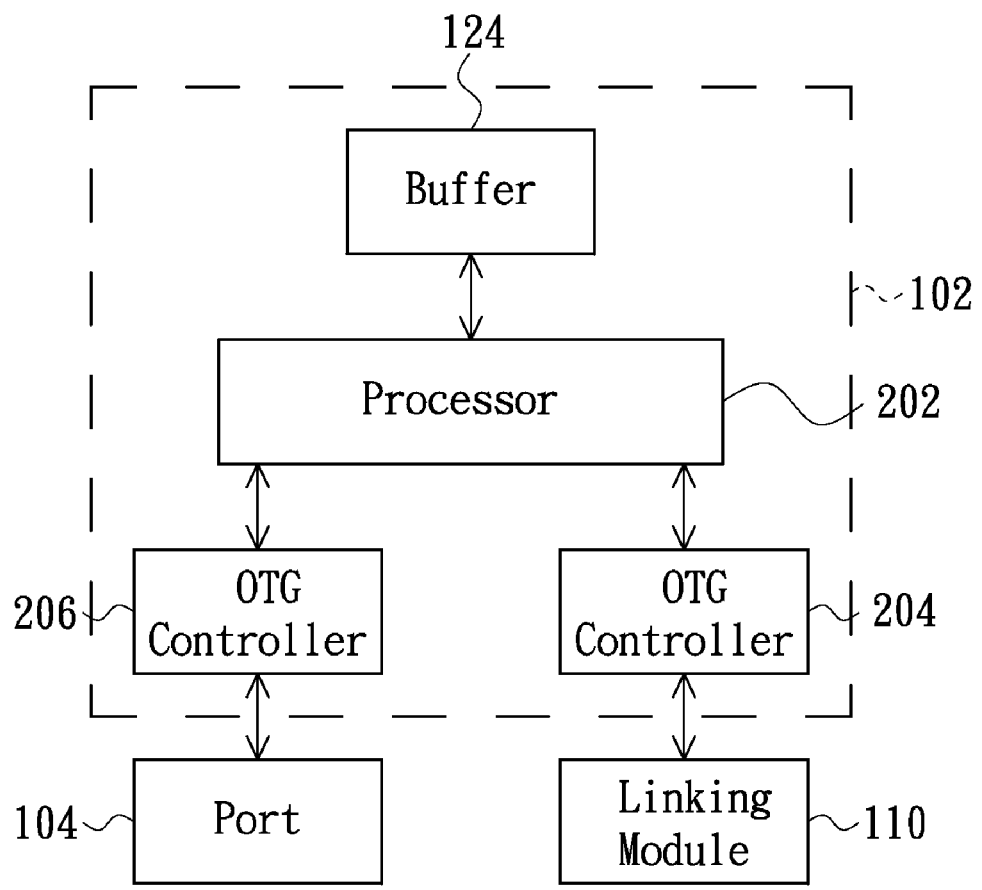
FIG. 2 shows a flow chart performed by an application program according to one preferred embodiment of the present invention.

FIG. 2 is a block diagram of the OTG control module according to one preferred embodiment of the present invention. Referring to the FIG. 2, the OTG control module further has a processor 202, OTG controllers 204 and 206. The processor 202 is coupled to the buffer 124, and the OTG controllers 204 and 206 respectively. Wherein, the OTG controller 204 is configured as a peripheral terminal and coupled to the linking module 110. On the contrary, the OTG controller 206 is configured as a host terminal and coupled to at least one of the USB ports 104, 106 and 108, such as the USB port 104.

Figure 3A:
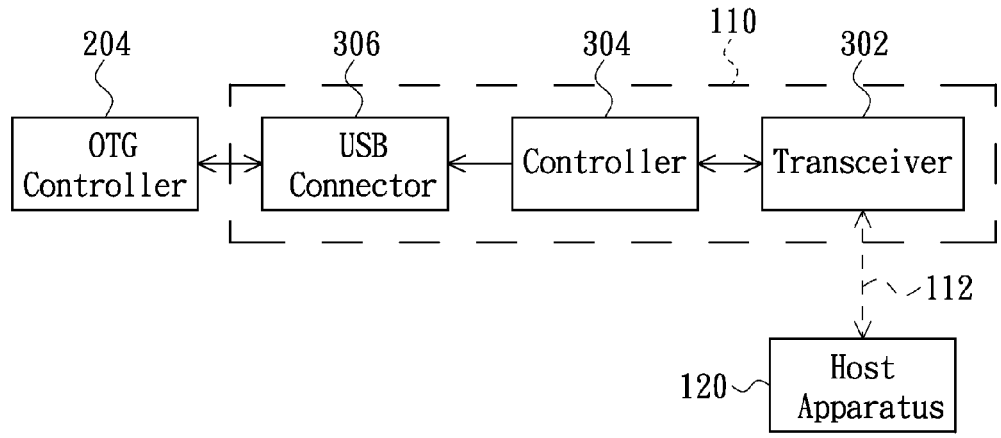
FIG. 3A is a block diagram of the linking module according to a first embodiment of the present invention.

FIG. 3A is a block diagram of the linking module according to a first embodiment of the present invention. Referring the FIG. 3A, in some embodiments, the linking module 110 has a transceiver 302, a controller 304, and a USB connector 306. The controller 304 is coupled to the transceiver 302 and the USB connector 306 respectively. In addition, the transceiver 302 can link with the HOST apparatus 120 via the data transmission interface 112. Wherein, the data transmission interface 112 is probably a wireless transmission interface, such as Bluetooth transmission interface, infrared transmission interface, WiFi transmission interface, 3G (third-generation) mobile transmission interface, and 4G (fourth generation) mobile transmission interface. Additionally, the USB connector 306 is coupled to the OTG controller 204 of the OTG control module 102.

Figure 3B:
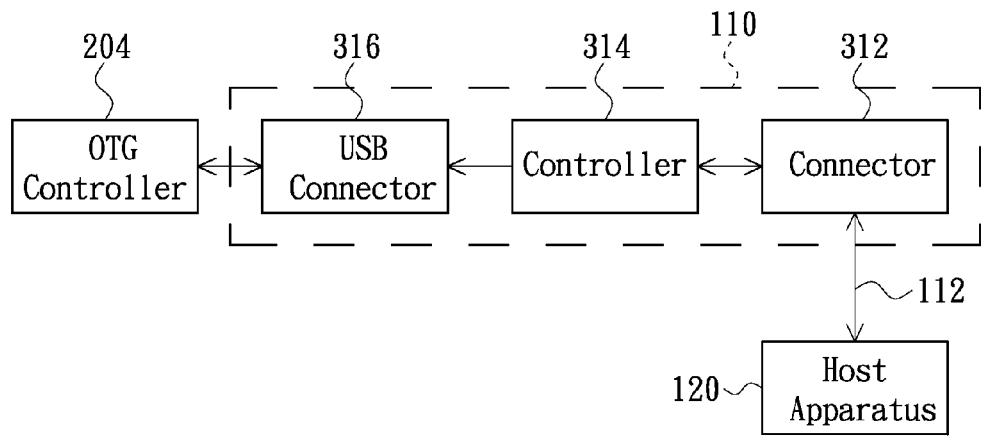
FIG. 3B is a block diagram of the linking module according to a second embodiment of the present invention.

FIG. 3B is a block diagram of the linking module according to a second embodiment of the present invention. In this embodiment, the linking module 110 also has a controller 314 and a USB connector 316. Similarly, the USB connector 316 is coupled to the controller 314 and the OTG controller 204 of the OTG control module 102. Differently, the linking module 110 has a connector 312 in this embodiment. Wherein, the connector 312 is coupled to the controller 314, and liked with the host apparatus 120 via the data transmission interface 112, such as a wire transmission interface. In some embodiments, the wire transmission interface 112 is different from the USB transmission interface.

Referring to the FIGS. 1 and 2, in this exemplary embodiment, an application software production (AP) 122 is installed into the host apparatus 120, such as a smart phone, a tablet computer, an e-book reader, a hand-held computing apparatus, etc. It is noted that the application software production is different from a driving program.

When the host apparatus 120 and the peripheral apparatus 130 link with the hub apparatus 100, the processor 202 identifies the host peripheral 130 as a host device because of the OTG controller 204 as a peripheral device and the peripheral apparatus 130 as a storage device because of the OTG controller 206 as a host terminal. In some embodiments, the peripheral apparatus 130 is probably a digital camera, a digital, a digital recorder, a digital sound player, etc.

In some embodiments, the processor 202 may read the content of the peripheral apparatus 130, and generate a read information. Meanwhile, the application software production would obtain the read information via the data transmission and show the read information on a screen of the host apparatus 120. Therefore, a user can get the information about the content of the peripheral apparatus 130. At this time, when the user want get a data from the peripheral apparatus 130 through the host apparatus 120, the user can operate the host apparatus 120 to ask the application software production 122 to generate a data capturing requirement DC_REQ. Wherein, the data is probably a file group, a file folder, or a single file, such as a picture file, a music file, a video file, a document file, or an e-mail file, etc.

Since the OTG controller 206 is configured as a host terminal, the hub apparatus 102 is seen a host device from the peripheral apparatus 130. Therefore, the processor 202 controls the OTG controller 206 capturing the data asserted by the user from the storage device via the USB port. Then, the processor 202 saves the captured data into the buffer 124.

On the contrary, due to the OTG controller is configured as a peripheral terminal, the hub apparatus 100 is seen a peripheral device from the host apparatus 120. Such that, the processor 202 moves the data saved into the buffer 124 to the OTG controller 204, and controls the OTG controller 204 send the data to the link module 110. Meanwhile, the data would sent to the controller 314 via the USB connector, as shown in the FIG. 3A or 3B. Then, the controller 314 sends the data to the transceiver 302 or the connector 312, so as to transmit the data to the host device via the data transmission interface 112 for responding the data capturing requirement DC_REQ. It is seen that the host apparatus 120 captures the data from the peripheral apparatus 130 directly.

Figure 4:
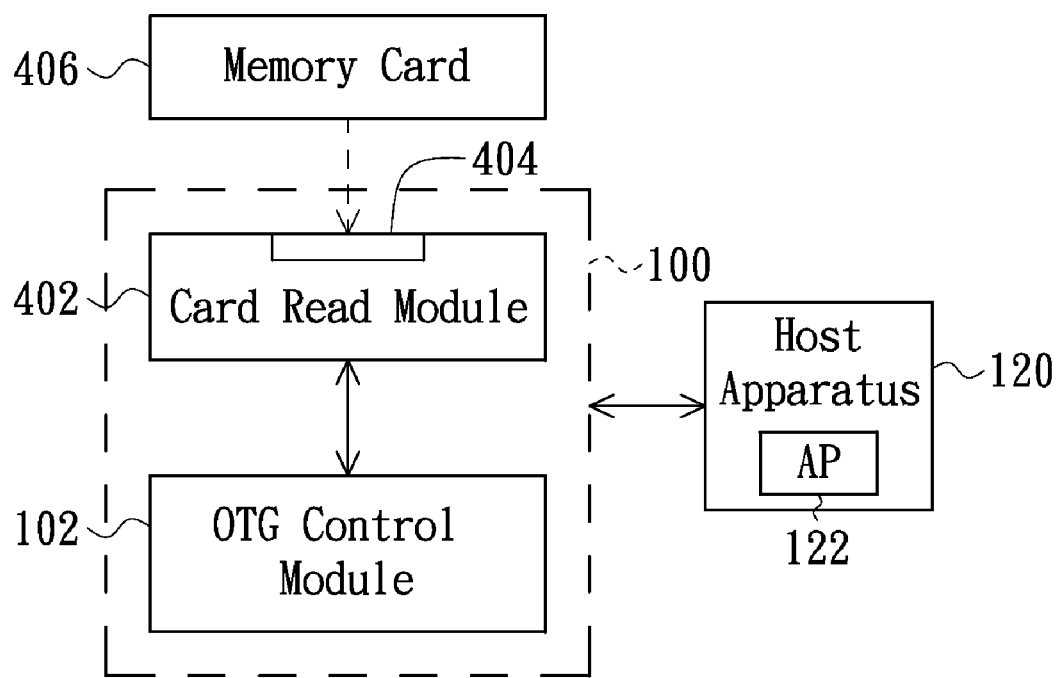
FIG. 4 is a block diagram of the hub apparatus according to a third embodiment of the present invention.

FIG. 4 is a block diagram of the hub apparatus according to another embodiment of the present invention. Referring FIG. 4, in this embodiment, the hub apparatus 100 further has a card read module 402 which is coupled to the OTG control module 102. The card read module 402 has a memory card slot 404 which is conformed to at least one specification of memory card. When a memory card 406 is inserted into the memory card slot 404, the OTG control module 102 can capture the data saved into the memory card 406 as the above maintained. In some embodiments, the memory card 406 is probably a PCMCIA card, CF card (type 1 and 2), SD card, mini SD card, micro SD card, SDHC card, T flash card, MMC card, RS-MMC card, MS card (Pro, Pro Duo, and micro), SM card, xD card, SDXC card, MS XC card, etc.

Figure 5:
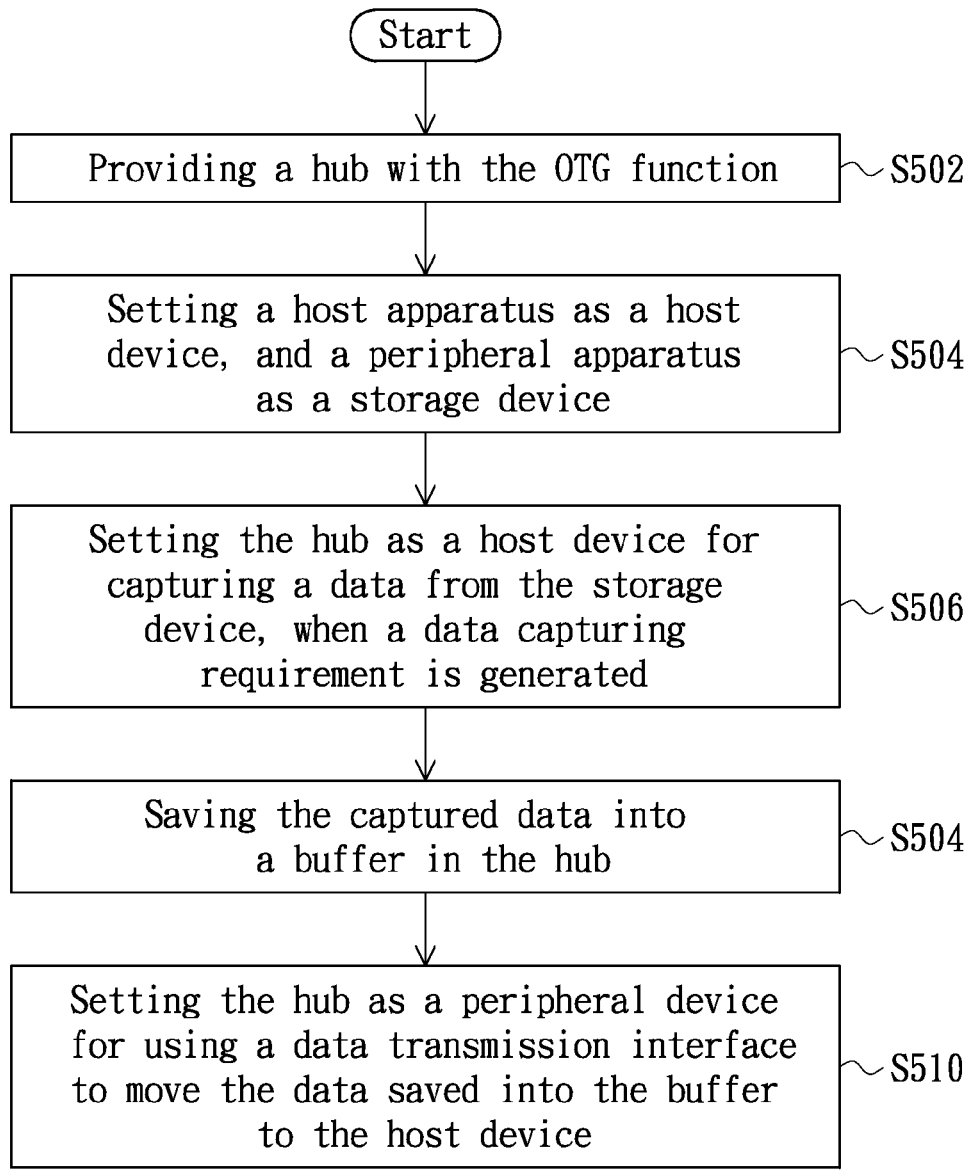
FIG. 5 is a flow chart of a method of a host apparatus without the OTG function capturing data from a peripheral apparatus according to one preferred embodiment of the present invention.

FIG. 5 is a flow chart of a method of a host apparatus without the OTG function capturing data from a peripheral apparatus according to one preferred embodiment of the present invention. In this embodiment, the method shown in the FIG. 5 provides a hub having the OTG function, as the description in the step S502. When the host apparatus and the peripheral apparatus link with the hub respectively, as the description in the step S504, the host apparatus is set as a host device, and the peripheral device is set as a storage device. Then, when a data capturing requirement is generated by the host apparatus for capturing a data saved in the peripheral apparatus, the step S506 is executed to set the hub as a host device for capturing the data from the storage device.

Meanwhile, the captured data, as description in the step S508, is saved into a buffer in the hub. Next, the hub is set as a peripheral device for using a data transmission interface to move the data saved into the buffer to the host device as the description in the step S510. In some embodiment, the data transmission interface different from the USB transmission interface.

In summary, the present invention provides a hub with the OTG function to link the host apparatus and the peripheral apparatus. Therefore, the hub can make the host apparatus to capture the data from the peripheral through the OTG function even the host apparatus without the OTG function.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A hub apparatus, suitable for linking with at least one host apparatus without the OTG function and one peripheral apparatus, comprising:
    an OTG (on-the-go) control module, having a buffer;
    at least one USB port, coupled to the OTG control module; and
    a linking module, coupled to the OTG control module for linking with the host apparatus via a data transmission interface, and further comprising:
        a non-USB connector for connecting with the peripheral apparatus via the data transmission interface;
        a controller, coupled to the non-USB connector for capturing the data from the peripheral apparatus via the non-USB connector and the data transmission interface; and
        a USB connector, coupled to the controller and the OTG control module, so as to transmit the captured data to the OTG control module;
    wherein the OTG control module captures a data from the peripheral apparatus via the USB port and saves the captured data into the buffer, so as to move the data saved in the buffer to the host apparatus via the data transmission for responding a data capturing requirement from the host apparatus.

2. The hub apparatus as claimed in claim 1, wherein the OTG control module further comprises:
    a first OTG controller, coupled to the USB port and configured as a host terminal;
    a second OTG controller, coupled to the linking module and configured as a peripheral terminal; and
    a processor, coupled to the buffer, the first and second OTG controllers to control the first OTG controller to capture the data and save the captured data into the buffer, and move the data saved into the buffer to the second OTG controller, so as to control the second OTG controller send the data to the host apparatus via the data transmission interface.

3. The hub apparatus as claimed in claim 1, wherein the data transmission interface is a wire transmission interface.

4. The hub apparatus as claimed in claim 1, wherein the data transmission interface is one of Bluetooth transmission interface, infrared transmission interface, WiFi transmission interface, 3G (third-generation) mobile transmission interface, and 4G (fourth generation) mobile transmission interface.

5. The hub apparatus as claimed in claim 1, further comprising a card read module with a memory card slot for containing a memory card coupled to the OTG control module, so as to capture a data from the memory as the memory inserting into the memory card slot.

6. A method of a host apparatus without the OTG function capturing a data from at least one peripheral apparatus, comprising the following steps in the order named:
    a) providing a hub with the OTG function;
    b) setting the host apparatus as a host device and the peripheral apparatus as a storage device, when the host apparatus and the peripheral apparatus link with the hub;
    c) setting the hub as a host device for capturing a data from the storage device, when a data captured requirement is generated by the host device;
    d) saving the captured data into a buffer configured in the hub; and
    e) setting the hub as a storage device for using a data transmission interface to move the data saved into the buffer to the host device for responding the data capturing requirement.

7. The method as claimed in claim 6, wherein the step of using the data transmission comprises:
    using the Bluetooth transmission interface, the infrared transmission interface, the WiFi transmission interface, the 3G (third-generation) mobile transmission interface, or the 4G (forth generation) mobile transmission interface to move the data to the host device.

8. The method as claimed in claim 6, the data is a single file or a file group, or a file folder.

9. The method as claimed in claim 8, wherein the single file is a picture file, a music file, a video file, a document file, or an e-mail file.

* * * * *